United States Patent
Brueck et al.

(10) Patent No.: US 10,718,244 B2
(45) Date of Patent: Jul. 21, 2020

(54) METHOD FOR OPERATING A DEVICE FOR PROVIDING A LIQUID ADDITIVE

(71) Applicant: CONTINENTAL AUTOMOTIVE GMBH, Hannover (DE)

(72) Inventors: Rolf Brueck, Bergisch Gladbach (DE); Jan Hodgson, Troisdorf (DE)

(73) Assignee: Continental Automotive GmbH, Hannover (DE)

( * ) Notice: Subject to any disclaimer, the term of this patent is extended or adjusted under 35 U.S.C. 154(b) by 985 days.

(21) Appl. No.: 14/650,357

(22) PCT Filed: Nov. 8, 2013

(86) PCT No.: PCT/EP2013/073450
§ 371 (c)(1),
(2) Date: Jun. 8, 2015

(87) PCT Pub. No.: WO2014/086553
PCT Pub. Date: Jun. 12, 2014

(65) Prior Publication Data
US 2015/0300230 A1    Oct. 22, 2015

(30) Foreign Application Priority Data

Dec. 7, 2012 (DE) .......................... 10 2012 111 919

(51) Int. Cl.
*F01N 3/20* (2006.01)
(52) U.S. Cl.
CPC ........ *F01N 3/2066* (2013.01); *F01N 2610/01* (2013.01); *F01N 2610/02* (2013.01);
(Continued)

(58) Field of Classification Search
CPC ........... F01N 3/2066; F01N 2610/1406; F01N 2610/1426; F01N 2610/144;
(Continued)

(56) References Cited

U.S. PATENT DOCUMENTS 2,765,743 A * 10/1956 Hollinshead ............ F04C 14/28
200/83 R
5,133,484 A * 7/1992 Globert .................... B67D 7/58
137/590

(Continued)

FOREIGN PATENT DOCUMENTS

CN    101084053 A    12/2007
CN    101573515 A    11/2009
(Continued)

*Primary Examiner* — Kevin F Murphy
*Assistant Examiner* — Patrick C Williams
(74) *Attorney, Agent, or Firm* — Laurence A. Greenberg; Werner H. Stemer; Ralph E. Locher

(57) ABSTRACT

A method for operating a device for providing a liquid additive includes feeding the liquid additive along a feeding path having at least one first portion which forms a heat conducting section from a heater of the device into a tank for the liquid additive. The feeding path also has at least one second portion in which a component susceptible to freezing is disposed. The liquid additive is first fed along the feeding path of the device. Subsequently, the feeding of liquid additive is stopped. Then, partial draining of the feeding path takes place, with liquid additive remaining in the at least one first portion of the feeding path while the at least one second portion is being drained. A device for providing a liquid additive is also provided.

17 Claims, 4 Drawing Sheets

(52) U.S. Cl.
CPC .... *F01N 2610/10* (2013.01); *F01N 2610/144* (2013.01); *F01N 2610/1406* (2013.01); *F01N 2610/148* (2013.01); *F01N 2610/1426* (2013.01); *F01N 2610/1486* (2013.01); *Y02T 10/24* (2013.01)

(58) Field of Classification Search
CPC ............ F01N 2610/01; F01N 2610/02; F01N 2610/10; F01N 2610/1486; F01N 2610/148; Y02T 10/24
See application file for complete search history.

(56) References Cited

U.S. PATENT DOCUMENTS

| | | | |
|---|---|---|---|
| 5,884,475 | A | 3/1999 | Hofmann et al. |
| 7,654,080 | B2 | 2/2010 | Ripper et al. |
| 7,836,684 | B2 | 11/2010 | Starck et al. |
| 7,937,932 | B2 | 5/2011 | Hager et al. |
| 8,857,160 | B2 | 10/2014 | Haeberer |
| 9,038,374 | B2 | 5/2015 | Brueck et al. |
| 9,494,069 | B2 | 11/2016 | Haeberer et al. |
| 2010/0064668 | A1 | 3/2010 | Beckmann et al. |
| 2010/0326546 | A1 | 12/2010 | Haeberer et al. |
| 2013/0000760 | A1* | 1/2013 | Crary .................... F01N 3/2066 137/565.17 |

FOREIGN PATENT DOCUMENTS

| | | |
|---|---|---|
| CN | 102272421 | 12/2011 |
| DE | 102004030441 A1 | 1/2006 |
| DE | 102006061732 A1 | 7/2008 |
| DE | 102007017458 A1 | 10/2008 |
| DE | 102008009650 A1 | 8/2009 |
| DE | 102008000594 A1 | 9/2009 |
| DE | 102010033038 A1 | 2/2012 |
| JP | 4894827 B2 | 3/2012 |
| KR | 20120076353 A | 7/2012 |
| WO | 9608639 A1 | 3/1996 |
| WO | 2006131201 A2 | 12/2006 |

\* cited by examiner

METHOD FOR OPERATING A DEVICE FOR PROVIDING A LIQUID ADDITIVE

BACKGROUND OF THE INVENTION

Field of the Invention

The invention relates to a method for operating a device for providing liquid additive. Devices for providing liquid additive are used for example in the case of motor vehicles in order to feed a liquid additive, such as for example fuel and/or urea-water solution, to exhaust aftertreatment devices.

Exhaust treatment devices to which a liquid additive is fed are used in particular in the case of motor vehicles with diesel engines. In the case of diesel engines, exhaust treatment devices or exhaust treatment processes in which nitrogen oxide compounds in the exhaust gas are reduced with the aid of a liquid additive are typically used for cleaning the exhaust gases. Such an exhaust treatment process is for example the process of selective catalytic reduction (SCR). For this process, a reducing agent or a reducing agent precursor is used as the liquid additive. Used particularly frequently as the liquid additive is a urea-water solution, which for the purpose of the process of selective catalytic reduction for example is obtainable with a urea content of 32.5% under the trade name AdBlue®.

It is a critical factor in the structural design of devices for providing liquid additive that the liquid, water-based, additives can freeze at low temperatures. The described urea-water solution AdBlue® for example freezes at −11° C. Such low temperatures may occur in motor vehicles, in particular when they are at a standstill for a long time. The freezing of the liquid additive causes an increase in the volume of the liquid additive. This increase in volume may lead to a considerable increase in pressure in the system, and there is therefore the risk of certain components of the device being damaged or even destroyed.

To avoid the problems associated with the increase in volume when the liquid additive freezes, it is known to drain the devices after stopping the operation of an internal combustion engine. Once draining has taken place, there is no liquid additive in the device and damage due to frozen liquid additive cannot occur. However, this has the effect that the system has to be completely "filled" again before renewed, exact metering can be performed.

To be able to quickly make a device for providing liquid additive operational again when there is frozen liquid additive in the device, such devices often have at least one heater.

However, the heat distribution that happens during the operation of a heater within a device for providing liquid additive can be problematic. The heat of the heater should reach the frozen liquid additive in a specifically directed manner in order to make effective melting of the frozen liquid additive possible. At the same time, undesirably high temperatures locally should be avoided, because they can lead to a chemical reaction of the liquid additive, and components of the device can possibly even be damaged due to excessively high temperatures. It is therefore important that the heat produced by the heater is distributed well.

BRIEF SUMMARY OF THE INVENTION

On this basis, it is an object of the present invention to solve, or at least mitigate, the technical problems described in connection with the prior art. In particular, it is intended to describe a particularly advantageous method for operating a device for providing a liquid additive. In particular, technically simple protection from damage caused by freezing and quick availability of the system for providing an additive, such as a urea-water solution, to the exhaust system of a motor vehicle are the main concerns here.

These objects are achieved by the method according to the features recited below. Further advantageous refinements of the method are specified in the dependently drafted patent claims. The features individually recited in the patent claims can be combined with one another in any desired, technically meaningful way, and can be supplemented by explanatory matter from the description, thereby presenting further implementational variants of the invention.

The invention relates to a method for operating a device for providing a liquid additive, comprising a feeding path along which the liquid additive is fed, the feeding path having at least one first portion, which forms a heat conducting section from a heater of the device into a tank for the liquid additive, and the feeding path also having at least one second portion, in which a component susceptible to freezing is arranged, comprising at least the following steps:

a) feeding liquid additive along the feeding path of the device;
b) stopping the feeding of liquid additive;
c) partially draining the feeding path, liquid additive remaining in the at least one first portion of the feeding path.

The liquid additive is preferably a urea-water solution. A feeding path is intended in particular to mean a flow path extending from an intake port in a tank to a dispensing port for the liquid additive at an exhaust treatment device. The feeding path is at least predominantly formed by a line and/or a channel through which the liquid additive is fed.

The liquid additive is stored in the tank. The intake port is preferably formed in the vicinity of the bottom of the tank in order that the liquid additive stored in the tank can be removed from the tank as completely as possible. The dispensing port at the exhaust treatment device preferably has at least one injector and/or a nozzle and/or a (passive) valve. With a nozzle, the liquid additive can be fed to the exhaust treatment device in a preferably finely atomized manner (possibly by means of compressed air). An injector makes metering of the liquid additive possible. Metering is performed in a target-oriented manner, for example by fixing the opening time of the injector.

Preferably arranged on or in the feeding path is a feeding means by which the feeding of the liquid additive takes place. The feeding means is preferably at least one pump. A piston pump, a diaphragm pump or a positive-displacement pump may be used for example as the feeding means. The feeding means is set up for feeding the liquid additive from the intake port along the feeding path with a corresponding feeding direction to the dispensing port.

The first portion and the second portion are regions of the feeding path that are arranged one behind the other (possibly directly) in the feeding direction of the liquid additive through the feeding path from the tank to the dispensing port. The feeding path may have a number of first portions and/or a number of second portions. At least one first portion is preferably arranged directly downstream of the intake port. Following thereafter (possibly directly) in the feeding direction there is preferably at least one second portion.

The device may comprise a structural unit with a housing that can be inserted into a tank for liquid additive and in which all the components that are necessary for the feeding and/or metering of the liquid additive are arranged. The housing of the device preferably forms a portion of a wall of the tank. The housing is preferably fitted in an opening in the bottom of the tank and thus closes the opening in the bottom of the tank. The intake port for removing the liquid additive from the tank is preferably formed on the housing. The intake port is thus located in the vicinity of the bottom of the tank. The already mentioned heater is also preferably arranged in the housing. This heater may be an electric heater or a conducting loop for carrying a heating medium, the heating medium giving off heat as it passes through the conducting loop. The heating medium may for example be (already heated) cooling water of the internal combustion engine.

A heat conducting section in the first portion is intended to mean a region that is designed such that heat is conducted through it from the heater to the tank, so that the additive in the tank is heated up. A heat conducting section is accordingly a structural region of the feeding path from the heater to the space inside the tank. No special or additional heat conducting means that are aligned in the direction of the desired flow of heat have to be present for a heat conducting section to exist. The feeding path also does not have to run in the same direction as the desired flow of heat in the region of the heat conducting section in order that the feature of a heat conducting section is provided. It is preferred for example that, in the region of the heat conducting section, the feeding path typically runs perpendicularly in relation to the direction of the heat conducting section or parallel to a sector of the tank that is to be heated up. The heat conducting section preferably also runs through the housing of the device or at least partially parallel thereto. In the region of the heat conducting section, the feeding path preferably has a great (two-dimensional) extent and forms a surface area that is parallel to the feeding path.

The component that is susceptible to freezing in the second portion is for example an electronic and/or movable component, such as in particular a pump, a sensor and/or a valve. The component that is susceptible to freezing has in particular the characteristic that it can be damaged by an increase in volume when the liquid additive—located nearby—freezes.

The feeding of liquid additive along the feeding path in step a) corresponds to normal operation of a device for providing the liquid additive. In step a), the liquid additive is for example fed to an exhaust treatment device. During step a), a motor vehicle in which the described device is installed is usually operated in a regular manner. This means that the internal combustion engine of the motor vehicle is running and exhaust gases of the internal combustion engine are cleaned in the exhaust treatment device. For this purpose, additive is added to the exhaust gas as and when required and by using the device.

The stopping of the feeding in step b) is usually accompanied by operationally stopping the feeding. Such an operational stop takes place in particular at the same time, or at almost the same time, as operational stopping of the motor vehicle, in which the internal combustion engine and the exhaust treatment device of the motor vehicle are also deactivated or stopped. Following that, a standstill phase of the motor vehicle consequently occurs.

In step c), the feeding path is (only) partially drained, the at least one second portion being drained and liquid additive remaining in the at least one first portion. In other words, this means in particular that draining is not performed completely, but instead all of the second portions are specifically cleared of liquid additive.

The described method is based on the realization that the draining of a device for providing liquid additive can have adverse effects on the distribution of the heat that is produced by a heater in the device. The reason for this is that the thermal conductivity of the liquid additive is much higher than the thermal conductivity of air or gas that is usually present in the drained portions of the feeding path. Therefore, drained portions of the feeding path may act as insulations, which hinder the distribution of heat of a heater. This is the case in particular when the feeding path has large expansive regions in certain portions (for example in the manner of a meandering heating loop arrangement). The feeding path may have such expansive portions in particular in the region of the intake port. These expansive regions then form heat conducting sections extending from a heater into the tank for the liquid additive. If liquid additive still remains in such expansive regions after (partial) draining, particularly effective distribution or transmission of the heat produced by the heater is made possible. At the same time, however, the components that are susceptible to pressure can be protected, because the additive has been removed from their (direct) vicinity.

The method is particularly advantageous when the feeding of the liquid additive along the feeding path in step a) takes place with a feeding direction, and the draining in step c) takes place at least predominantly counter to the feeding direction.

It is preferred here that a feeding direction of a pump for the feeding of the liquid additive is reversed for the draining of the feeding path according to step c).

In order to carry out the draining counter to the feeding direction, a feeding means (in particular a pump) that can feed both in the feeding direction and in the reverse direction is provided. Liquid additive is then typically forced back into the tank through the intake port at the tank. On the opposite side, that is to say at a dispensing port, gas or air is then taken in. From here, the feeding path is then filled with air or gas, which replaces the liquid additive. By a reversal of the pump, the additive is therefore pumped with a return feeding direction, which is directed counter to the feeding direction. It is possible that each fraction of the additive fed back is fed exclusively to the intake port, but it may also be provided that for example at least one (branching) storage volume, into which a (small) fraction of the fed-back additive flows during step c), is provided on the feeding path. For the last-mentioned case it should nevertheless apply that the "predominant fraction" of the fed-back additive is removed from the feeding path counter to the feeding direction.

Such a reversal of the feeding direction of a pump is a technically particularly simple variant for realizing a reversible feeding direction in a device. A pump with a reversible feeding direction is for example a peristaltic pump. In the case of a peristaltic pump, a portion of the feeding path is deformed in the manner of a peristaltic movement in order to move the liquid additive in the feeding direction. Such a pump preferably has a rotary drive, which drives the peristaltic movement by way of a movable pump element. The movable pump element may for example be an eccentric. Such a pump is preferably designed such that a reversal of the feeding direction is possible by a reversal of the driving direction of the drive.

According to a further configurational variant, it is also possible that a device for providing liquid additive has two (possibly different) feeding means, a first feeding means being set up for feeding liquid additive during regular operation (step a)) and a further feeding means being set up for draining the feeding path counter to the feeding direction.

The two feeding means may be arranged in series or parallel to one another along the feeding path in parallel regions of the feeding path.

Following a further implementational variant of the method, it is also possible that the device for providing the liquid additive has a return line, which branches off from the feeding path and leads back into a tank. The draining of the feeding path may also take place through the return line.

The method is also advantageous when the first portion forms an enclosing area around the heater.

The enclosing area preferably forms (at least partially) a surrounding enclosure or a surrounding shell of the housing of the device. The enclosing area or the first portion is preferably a region that is shaped in the manner of a hollow cylinder and is formed around a housing of the device. Such a region may for example be arranged between the housing and a shroud that covers the housing with respect to the space inside a tank. On the underside of the enclosing area, an annular connecting gap may form the intake port to the tank. Such an enclosing area may advantageously also form or delimit an additive starting volume in the tank, in which an amount of liquid additive sufficient for the starting operation is already melted directly after the device is put into operation. In the region of such an enclosing area, the heater can heat up the liquid additive particularly effectively. This would not be possible when the enclosing area is free of liquid additive. Therefore, the described method is particularly advantageous in the case of such a design of the device.

The method is also advantageous when a filter for filtering the liquid additive is arranged in the first portion. It is particularly preferred that the filter is arranged in the first portion when the first portion is an enclosing area. Such an enclosing area offers sufficient space for a filter for cleaning the liquid additive. A filter for cleaning the liquid additive is advisable in the case of a described device in order to avoid contaminants of the liquid additive being able to penetrate into the feeding path and soil components of the device.

The method is also preferred when a pump is operated for a predetermined time interval for the partial draining of the feeding path in step c), the time interval being chosen such that liquid additive remains in the at least one first portion.

The draining of the feeding path requires a time period that is dependent on the structure of the device but is easy to determine. This time period is dependent in particular on the length of the feeding path and the (backward) feeding rate of the liquid additive in the feeding path. By operating a pump for draining the feeding path for a time interval that is shorter than the time period that is necessary to drain the feeding path completely, it can be ensured that partially liquid additive remains in the feeding path. In the case of the method for draining the feeding path (with a single pump), it should be ensured that during the draining the liquid additive is first removed from the second portion, in order that there is still liquid additive in the first portion when the draining is stopped after the time interval, while the second portion has already been drained completely. The implementational variant of the method is therefore advantageous in particular whenever the at least one first portion lies upstream of the at least one second portion in the feeding direction from the intake port to the dispensing port.

The invention is also advantageous when the partial draining of the feeding path in step c) is monitored by at least one sensor element, the sensor element being arranged at a point of the feeding path and being set up for detecting whether there is liquid additive at the point, and the draining also being stopped as soon as there is no longer any liquid additive at the point.

The sensor element may for example consist of two electrical pins, between which there is an electrically conductive connection as long as liquid additive is in contact with the pins. When the liquid additive is no longer in contact with the pins, the electrical connection is broken and it can be detected that there is no longer liquid additive at the point. Such a sensor element for detecting whether or not liquid additive is present is particularly advantageous whenever timing control alone is not sufficient for monitoring step c) on account of uncertainties with respect to the feeding rate for the liquid additive during draining. Even if the sensor element can in principle be provided for likewise undertaking other monitoring functions, a separate sensor element (of a technically simple construction) that is only provided for the aforementioned purpose may alternatively be used.

It is also advantageous when the sensor element is a pressure sensor and the pressure measured by the pressure sensor changes in dependence on the degree of filling of the feeding path.

In the case of this variant it is possible to detect by way of the pressure to what extent the feeding path has already been drained during step c), in order to stop the draining as soon as the at least one second portion has been drained and when there is still liquid additive in the at least one first portion.

A dependence between the pressure at the pressure sensor and the degree of filling of the feeding path may exist for example because of the hydrostatic pressure of the liquid additive in the feeding path. Thus, the hydrostatic pressure is all the greater the more liquid additive is present in the feeding path. A pressure sensor is normally provided in a device for providing liquid additive in order to monitor and/or control the regular operation of the device during the provision of the liquid additive (step a)). It is particularly advantageous when this pressure sensor is additionally used in step c) for monitoring the extent to which the feeding path has already been drained. Then, no additional components are necessary for the monitoring of step c).

The method is also advantageous when a pump is used for the partial draining of the feeding path in step c), an operating parameter of the pump changing in dependence on a degree of filling of the feeding path with liquid additive and draining operation of the pump being stopped when a predetermined value of the operating parameter is reached.

Such an operating parameter may for example be a response of the pump to an applied operating current. For example, a movable pump element reacts more quickly with a movement in response to an applied operating current when the amount of liquid additive in the feeding path is less. This may be the case because the amount of liquid additive to be moved by the pump has in this case already been reduced. The monitoring of the degree of filling of the feeding path on the basis of an operating parameter of a pump makes it possible to dispense with additional components for monitoring the draining in step c).

The method is also advantageous when the pump is set to a diagnostic mode at at least one predetermined point in time during the draining, the operating parameter of the pump that is dependent on the degree of filling of the feeding path being determined during the diagnostic mode.

A diagnostic mode is intended to mean a special operating mode of the device that is only activated in order to monitor the degree of filling of the feeding path. The diagnostic mode may for example comprise a special pump pulse, which is generated by a predetermined or defined diagnostic driving current of the pump. Thus, better comparability of the operating parameter can be ensured, in order that the determination of the degree of filling of the feeding path is particularly accurate.

It is also possible that a degree of filling of the feeding path is determined on the basis of a pressure and/or a change in pressure, which is measured by a pressure sensor and which occurs when the pump exerts a pump pulse. This pump pulse may be a normal pulse (such as during the normal operation of the pump when draining) and/or a special pump pulse (corresponding to a special diagnostic mode for monitoring the degree of filling).

The method is also advantageous when, for the partial draining of the feeding path in step c), the feeding path is first drained completely and the feeding path is subsequently partially filled again with liquid additive, so that there is liquid additive in the at least one first portion.

In the case of this operating mode, it is preferably initially not monitored whether or not the feeding path is only partially drained. It is consequently always ensured that complete draining of the feeding path has taken place. This may occur for example by a pump for draining the feeding path being operated for a time interval that is sufficiently long in order to ensure complete draining of the feeding path in every case. Subsequently (that is to say in particular immediately subsequently and/or without ending the "operational stop") (only) a partial refilling of the feeding path is carried out. In this case, the feeding path is not completely filled again. Such partial refilling may be monitored by all of the methods described further above that are also suitable for monitoring the draining.

Conducting the method in such a two-staged manner, in which complete draining first takes place and then only partial filling again, may be advantageous because the amount that is removed from the feeding path during the draining is typically much greater than the amount that is fed into the feeding path again during the refilling. It is therefore considerably easier to carry out the refilling precisely in such a way that liquid additive remains in the first portion, while the second portion has been drained completely.

According to a further embodiment of the described method, it is preferred that in step c) the partial refilling after complete draining of the feeding path takes place by way of the return line. By conducting the method in this way, it is also made possible that first portions of the feeding path that lie downstream in the feeding direction of second portions that are to remain drained are filled again with liquid additive. When the feeding path is first drained completely in step c), it may subsequently be filled through the dispensing port with gas or air and the return line filled with liquid additive in an alternating and specifically directed manner. This alternating filling may take place such that, after step c), in first portions there is liquid additive, which has entered the feeding path through the return line, while in second portions there is gas or air, which has entered the feeding path through the dispensing port. During the described specifically directed filling of the feeding channel, a feed pump may also reverse its feeding direction. Thus, intended amounts of the liquid additive can also be fed in a specifically directed manner into the portions of the feeding path between the return line and the dispensing port.

The method is also advantageous when the feeding path has at least one siphon, the at least one first portion being formed in the siphon.

Such a siphon is characterized in particular by a U-shaped design of the feeding path. This produces a lower region of the feeding path, which is respectively alongside two raised regions of the feeding path. The raised regions are arranged higher with respect to their geodetic position than the lower region. In such a siphon, a residual amount of the liquid additive typically collects as a result of gravitational force when the feeding path has been partially drained. The first portion is preferably arranged in such a siphon. By including a siphon in the structural design, it can be ensured that the amount of liquid additive present in the feeding path remains in the first portion even when there are external influences. Such external influences are for example if the device is moved, tipped and/or displaced in the partially drained filling state, and if vibrations act on the device.

A siphon is therefore a particularly reliable possibility for maintaining the partial draining of the feeding path in the desired form with drained second portions and a filled first portion even during long standstill times of a motor vehicle. The integration of at least one siphon in the feeding path may expressly be combined with all of the described measures for producing a distribution of the liquid additive in the feeding path with filled first portions and drained second portions. It is also possible that only the described siphon is provided for maintaining said distribution, and no deliberate (additional or active) method steps for producing the distribution are carried out in step c).

The invention is used in particular in the case of a device for providing a liquid additive, comprising a feeding path in which the liquid additive is fed, the feeding path having a first portion, which forms a heat conducting section from a heater of the device into a tank for the liquid additive, and the feeding path also having at least one second portion, in which a component susceptible to freezing is arranged, the device being set up for carrying out at least one variant described here of the method according to the invention.

It is also intended to provide a motor vehicle, having an internal combustion engine and an exhaust treatment device for cleaning the exhaust gases of the internal combustion engine. Preferably provided in the exhaust treatment device is an SCR catalytic converter, with which the process for selective catalytic reduction can be carried out for cleaning the exhaust gas. A liquid additive for carrying out the SCR process can be fed to the exhaust treatment device by way of a dispensing port. Thus, an injector at the dispensing port of the described device is supplied with liquid additive from a tank. A control device in which the method steps or method sequences required for carrying out the method are stored can be used for carrying out the described method. The control device may for example be a component part of the engine control of the motor vehicle.

BRIEF DESCRIPTION OF THE SEVERAL VIEWS OF THE DRAWING

The invention and the technical environment are explained in more detail below on the basis of the figures. The figures show particularly preferred exemplary embodiments, to which the invention is not restricted however. In particular, it should be pointed out that the figures, and in particular the relative sizes represented, are only schematic. In the drawing.

DESCRIPTION OF THE INVENTION

Figure 1:
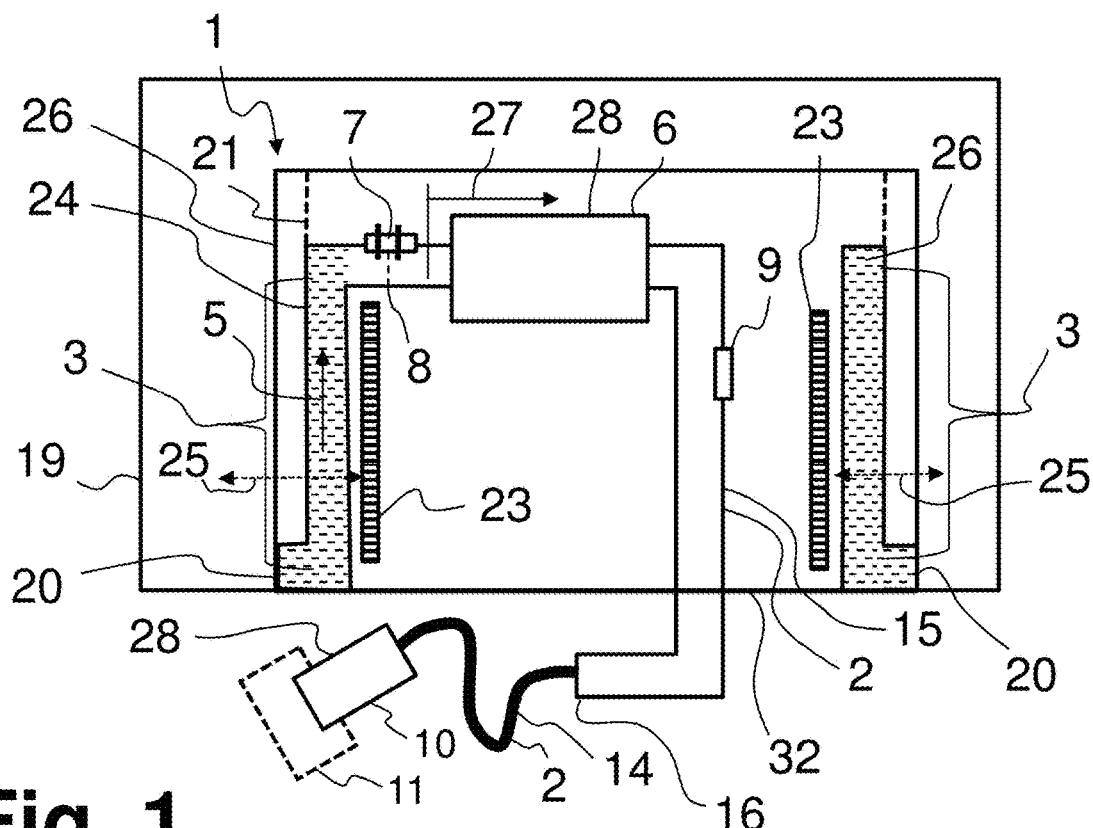
FIG. 1: shows a first configurational variant of a device for the described method.
Figure 3:
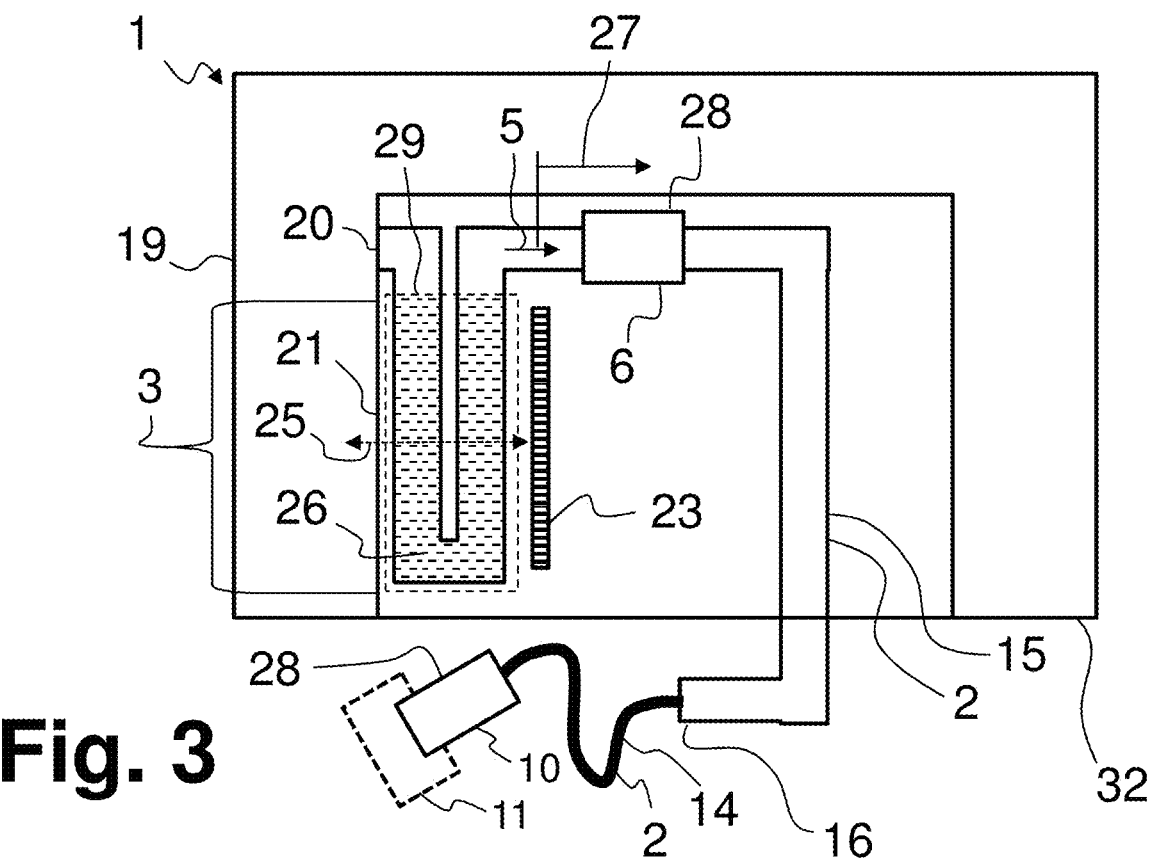
Figure 4:
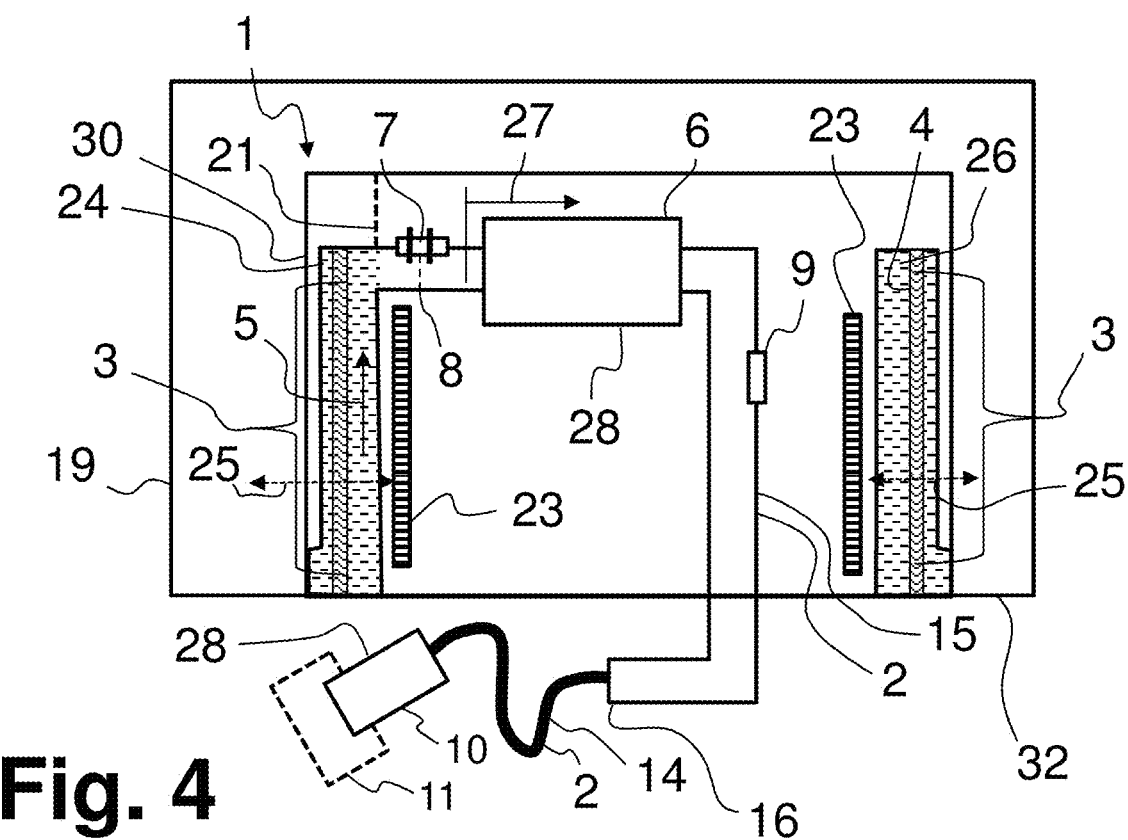
FIG. 4: shows a third configurational variant of a device for the described method.

In FIGS. 1, 3 and 4, devices 1 with which liquid additive 26 (here a urea-water solution in particular) can be removed from a tank 19 are respectively shown. The devices 1 have a housing 21, which is fitted in an opening at a bottom 32 of the tank 19. Preferably arranged on the housing 21 is an intake port 20, by way of which the liquid additive 26 can pass from the tank 19 into the feeding path 2.

The feeding path 2 extends from the intake port 20 with a feeding direction 5 toward an exhaust treatment device 11. Provided at the exhaust treatment device 11 is a dispensing port 10, by way of which the liquid additive 26 can be fed to the exhaust treatment device 11.

The feeding path 2 is partially formed by a feeding channel 15, which extends (initially or partially) through the housing 21. The feeding path 2 is also formed by a supply line 14, which extends from the housing 21 of the device to the dispensing port 10. The supply line 14 can be connected at a connection 16 to the housing 21 or to the feeding channel 15.

Along the feeding direction 5 there are on the feeding path 2 various components that serve for the feeding of the liquid additive 26. These components are for example a pump 6, by which the feeding of the liquid additive takes place, and also sensor elements 7 and/or pressure sensors 9.

Also provided in the housing 21 is a heater 23, by which the liquid additive 26 can be heated or frozen additive can be heated up or melted. Extending from the heater 23 into a space inside the tank 19 there runs a (perceptible, physical) heat conducting section 25. In a first portion 3, the feeding path 2 is a component part of this heat conducting section 25. By liquid additive 26 remaining in the first portion 3 during the operation of the device by the described method, it can be ensured that a high thermal conductivity from the heater 23 to the tank 19 exists in the heat conducting section 25.

The feeding path 2 also has at least one second portion 27, in which there is at least one component susceptible to freezing 28. Components susceptible to freezing 28 are for example the pump 6 for feeding the liquid additive or an injector that is arranged at the dispensing port 10. With the aid of the sensor element 7, it can be monitored whether or not there is still liquid additive 26 at a specific point 8 of the feeding path 2. In this way, the sensor element 7 makes it possible to monitor the degree of filling of the feeding path 2 effectively in the course of the described method.

Figure 2:
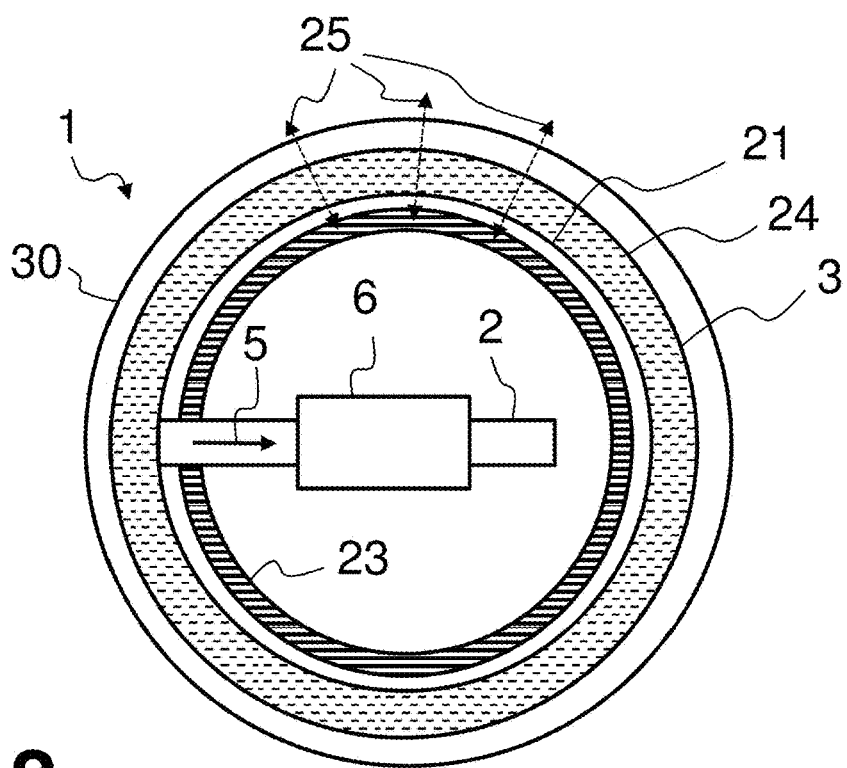
FIG. 2: shows a sectional view of the device from FIG. 1, FIG. 3: shows a second configurational variant of a device for the described method.

The first portion 3 of the feeding path is preferably an enclosing area 24, which surrounds the housing 21 of the device 1. This can be seen in particular in FIG. 2, which shows a horizontal sectional view through the device 1 that is represented in FIG. 1. The housing 21 can be seen, and also a shroud 30, which surrounds the housing 21, and the enclosing area 24, which is arranged between the housing 21 and the shroud 30 and forms the first portion 3 of the feeding path. The intake port 20, which can be seen in FIG. 1, forms a peripheral gap underneath the enclosing area 24. The enclosing area 24 or the first portion 3 forms a heat conducting section 25 from the heater 23 into the space inside the tank.

FIG. 3 shows a further configurational variant of a device 1. Here, the first portion 3 is configured as a siphon 29. By this configurational variant it can be ensured in a technically particularly simple manner that liquid additive 26 remains in the first portion 3.

FIG. 4 shows a modification of the device 1 according to FIG. 1. Here, a filter 4, with which the liquid additive can be filtered, is additionally arranged in the enclosing area 24.

Figure 5:
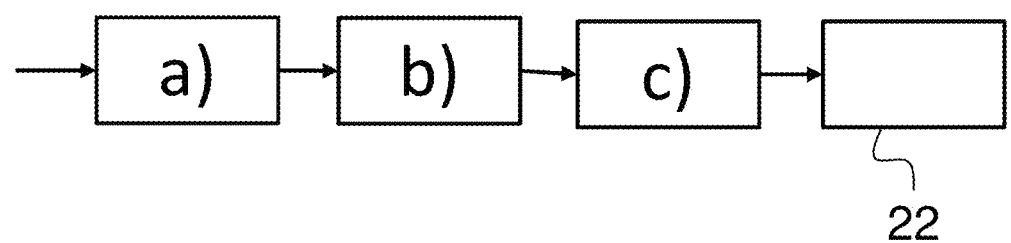
FIG. 5: shows a flow diagram of the described method.

FIG. 5 shows a flow diagram of the described method with method steps a), b) and c). Method step c), which concerns the partial draining of the feeding path, is followed by a freezing phase 22, which commences when the device is exposed to low temperatures after the operational stop in step b). It can be seen here that steps a), b) and c) are carried out one after the other in time.

Figure 6:
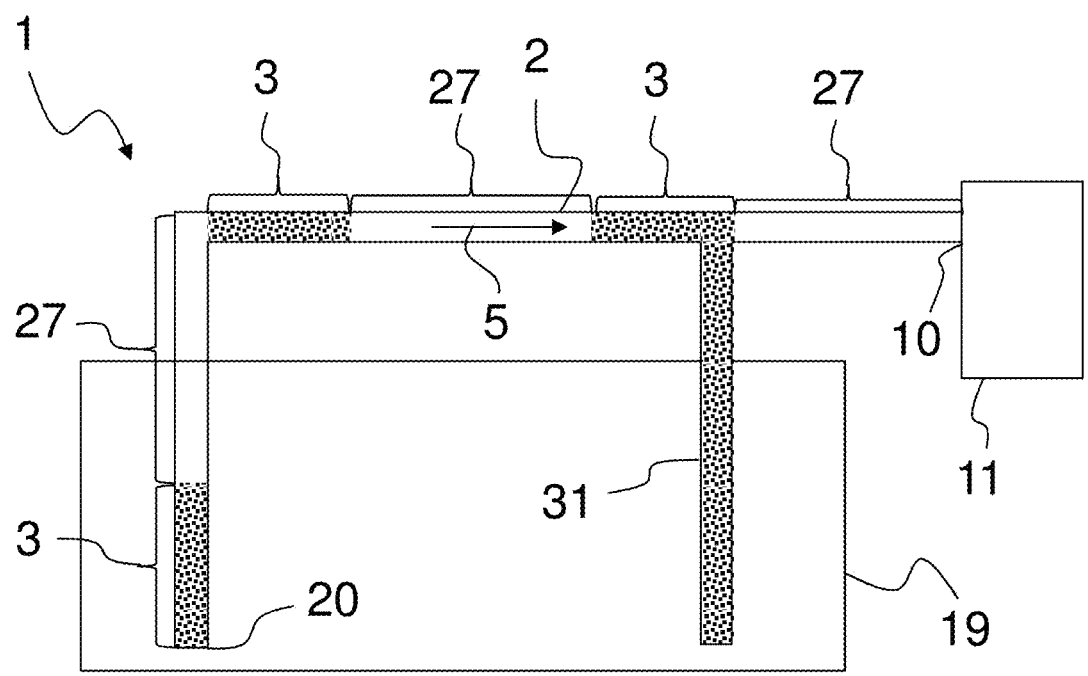
FIG. 6: shows a further configurational variant of a device for carrying out the described method.

FIG. 6 shows yet a further configurational variant of a device 1 for carrying out the described method. This device 1 also has a feeding path 2, which extends from an intake port 20 at a tank 19 with a feeding direction 5 toward a dispensing port 10 at an exhaust treatment device 11. From the feeding path 2 there branches off a return line 31, which is likewise connected to the tank 19. When the feeding path 2 of this device 1 is first drained completely step c), the feeding path 2 can be subsequently filled again in step c) alternately with liquid additive by way of the return line 31 and with gas or air by way of the dispensing port 10. It can thus be achieved in a specifically directed manner that there is liquid additive in first portions 3, while there is no liquid additive in second portions 27.

Figure 7:
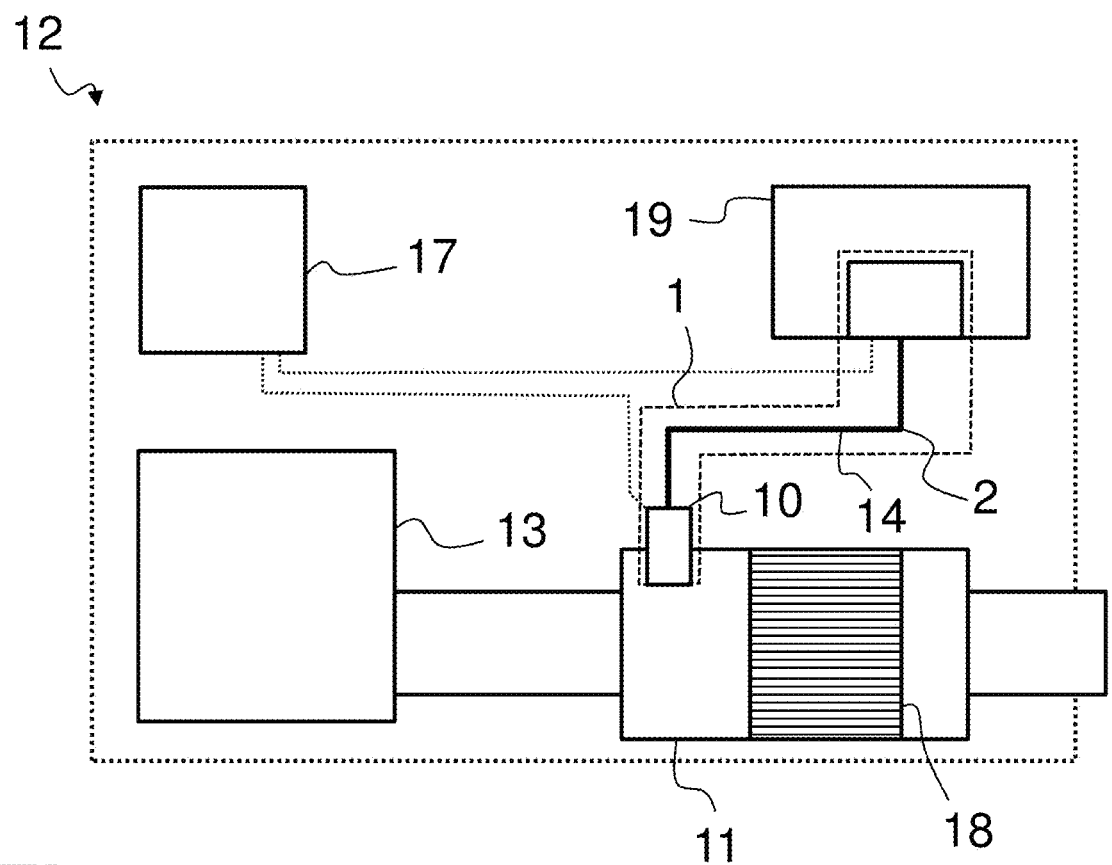
FIG. 7: shows a motor vehicle having a device for the described method.

FIG. 7 shows a motor vehicle 12 comprising an internal combustion engine 13 (such as a diesel engine) and an exhaust treatment device 11 for cleaning the exhaust gases of the internal combustion engine 13. Arranged in the exhaust treatment device 11 is an SCR catalytic converter 18 for carrying out the process of selective catalytic reduction. For this process, liquid additive can be fed by a device 1 from a tank 19 to the exhaust treatment device 11 at a dispensing port 10. For this purpose, the dispensing port 10 is connected to the tank 19 by way of a supply line 14. The motor vehicle 12 may have a control device 17, which may be a component part of the engine control of the motor vehicle 12, and which carries out the described method with the device 1.

LIST OF DESIGNATIONS

1 Device
2 Feeding path
3 Portion
4 Filter
5 Feeding direction
6 Pump
7 Sensor element
8 Point
9 Pressure sensor
10 Dispensing port
11 Exhaust treatment device
12 Motor vehicle
13 Internal combustion engine
14 Supply line
15 Feeding channel
16 Connection
17 Control device
18 SCR catalytic converter
19 Tank
20 Intake port
21 Housing
22 Freezing phase
23 Heater 24 Enclosing area
25 Heat conducting section
26 Liquid additive
27 Second portion
28 Component susceptible to freezing
29 Siphon
30 Shroud
31 Return line
32 Bottom

The invention claimed is:

1. A method for operating a device for providing a liquid additive, the method comprising the following steps:
provided a liquid additive feeding path having at least one first portion forming a heat conducting section from a heater of the device into a tank for the liquid additive and having at least one second portion with a component susceptible to freezing;
a) feeding the liquid additive along the feeding path of the device;
b) stopping the feeding of liquid additive; and
c) draining the feeding path until the at least one second portion is drained completely and stopping the draining with liquid additive maintained in the first portion.

2. The method according to claim 1, which further comprises:
carrying out the feeding of the liquid additive along the feeding path in step a) in a feeding direction; and
carrying out the draining of the liquid additive in step c) at least predominantly counter to the feeding direction.

3. The method according to claim 2, which further comprises feeding the liquid additive in a feeding direction of a pump and reversing the feeding direction for draining the feeding path according to step c).

4. The method according to claim 1, which further comprises providing the at least one first portion with an enclosing area around the heater.

5. The method according to claim 1, which further comprises providing a filter in the at least one first portion for filtering the liquid additive.

6. The method according to claim 1, which further comprises operating a pump for a predetermined time interval for the partial draining of the feeding path in step c), and choosing the time interval to keep liquid additive in the at least one first portion.

7. The method according to claim 1, which further comprises:
placing at least one sensor element at a point of the feeding path;
setting up the at least one sensor element for detecting if there is liquid additive at the point;
monitoring the partial draining of the feeding path in step c) by using the at least one sensor element; and
stopping the draining as soon as there is no longer any liquid additive at the point.

8. The method according to claim 7, which further comprises providing the at least one sensor element as a pressure sensor measuring a pressure changing in dependence on a degree of filling of the feeding path.

9. The method according to claim 1, which further comprises:
carrying out the partial draining of the feeding path in step c) by using a pump;
changing an operating parameter in dependence on a degree of filling of the feeding path with liquid additive; and
stopping the draining by the pump upon reaching a predetermined value of the operating parameter.

10. The method according to claim 9, which further comprises:
setting the pump to a diagnostic mode at least at one predetermined point in time during the draining; and
determining the operating parameter, being dependent on the degree of filling of the feeding path, during the diagnostic mode.

11. The method according to claim 1, which further comprises providing the feeding path with at least one siphon, and forming the at least one first portion in the siphon.

12. The method according to claim 1, which further comprises:
providing a housing in the tank, the housing having the heater disposed therein, the housing together with the at least one first portion defining the heat conducting section.

13. The method according to claim 1, which further comprises:
maintaining liquid additive in the first portion while the feeding of the liquid additive remains stopped during an operational stop.

14. A method for operating a device for providing a liquid additive, the method comprising the following steps:
providing a liquid additive feeding path having at least one first portion forming a heat conducting section from a heater of the device into a tank for the liquid additive and having at least one second portion with a component susceptible to freezing;
a) feeding the liquid additive along the feeding path of the device;
b) stopping the feeding of liquid additive;
c) partially draining the feeding path by maintaining the liquid additive in the at least one first portion while draining the at least one second portion; and
carrying out the partial draining of the feeding path in step c) by first draining the feeding path completely and subsequently partially filling the feeding path again with liquid additive, only until there is liquid additive in the at least one first portion and the second portion remains drained.

15. A device for providing a liquid additive, the device comprising:
a tank for the liquid additive;
a heater;
a feeding path for feeding the liquid additive along said feeding path, said feeding path having at least one first portion forming a heat conducting section from said heater into said tank, and said feeding path having at least one second portion;
a component susceptible to freezing being disposed in said at least one second portion; and
a controller being programmed to:
a) feed the liquid additive along said feeding path;
b) stop the feeding of liquid additive; and
c) drain said feeding path until said at least one second portion is drained completely and stop draining with liquid additive maintained in said first portion.

16. The device for providing a liquid additive, according to claim 15, further comprising a housing disposed in said tank, said heater being disposed in said housing, said first portion together with said housing forming said heat conducting section from said heater into said tank.

17. The device for providing a liquid additive, according to claim 16, further comprising a shroud surrounding said housing, said shroud and said housing defining said first portion.

* * * * *